United States Patent [19]

Hamane et al.

[11] 4,383,360
[45] May 17, 1983

[54] APPARATUS FOR INSERTING COILS INTO CORE STRUCTURE WITH INNER AND OUTER COIL ADVANCING MEANS

[75] Inventors: Tokuhito Hamane, Hirakata; Masaaki Tasai, Kadoma, both of Japan

[73] Assignee: Matsushita Electric Industrial Company, Limited, Osaka, Japan

[21] Appl. No.: 231,934

[22] Filed: Feb. 4, 1981

[30] Foreign Application Priority Data

Feb. 6, 1980 [JP] Japan .................................. 55-14141

[51] Int. Cl.³ ............................................. B23P 19/00
[52] U.S. Cl. .......................................... 29/736; 29/596
[58] Field of Search .................. 29/732, 734, 736, 596, 29/606

[56] References Cited

U.S. PATENT DOCUMENTS

| | | | |
|---|---|---|---|
| 3,672,039 | 6/1972 | Arnold | 29/734 |
| 3,874,056 | 4/1975 | Peters | 29/736 |
| 4,281,450 | 8/1981 | Bale | 29/736 |
| 4,327,478 | 5/1982 | Müller | 29/736 |

*Primary Examiner*—Carl E. Hall
*Assistant Examiner*—P. W. Echols
*Attorney, Agent, or Firm*—Lowe, King, Price & Becker

[57] ABSTRACT

Coils are manually inserted into respective guide paths of a coil inserting jig which is placed with respect to an advancing mechanism. A coil advancing pusher is movably located inside the jig to move the inner portions of the coils toward a core structure mounted on the jig. A coil holding device is provided externally of the jig for engaging the outer portions of the coils when the inner coil portions are initially advanced toward the core structure. The inner coil pusher and the outer coil holding device are simultaneously moved by the advancing mechanism for coaction with each other to advance the inner and outer coil portions toward the core structure with the coil orientations substantially aligned with the grooves of the core structure to ensure smooth insertion of the coils respectively into the core grooves.

4 Claims, 6 Drawing Figures

4,383,360

APPARATUS FOR INSERTING COILS INTO CORE STRUCTURE WITH INNER AND OUTER COIL ADVANCING MEANS

BACKGROUND OF THE INVENTION

The present invention relates to a coil insertion apparatus for inserting coils in respective grooves of a core structure.

Conventional coil insertion apparatus employ a jig having a plurality of coil guide paths formed by parallel guide members angularly spaced apart so that the guide paths are aligned respectively with the grooves of a core structure which is mounted on the jig. A coil pusher is movably mounted inside the jig to advance the inner portions of the coils which have been manually inserted into the guide paths. An advancing mechanism is provided to move the pusher toward the core structure, so that the inner portions of the coils are forced into the core grooves. It is the usual practice for coils to be inserted into the guide paths in a relatively horizontally tilted position to permit the inner portions of the coils to rest on the coil pusher and to be effectively moved toward the core structure. However, due to the large difference in angular orientation between the core grooves and the coils being inserted therein, the coils tend to become entangled with each other as they encounter the lower edges of the core structure, producing a substantial amount of friction to cause damages or scratches on the coils or deformation of the core structure.

SUMMARY OF THE INVENTION

The coil insertion apparatus according to the invention comprises a coil holding device arranged to move externally along the length of a jig and a moving mechanism which causes the coil holding device to engage and hold the outer portions of the coils on the jig and to move the holding device toward the core structure at the instant the inner coil pusher starts advancing the inner portions of the coils so that the inner and outer coil portions are moved toward the core structure simultaneously. Upon engagement with the outer coil portions, the external coil holding device bears against the horizontally tilted outer coil portions to alter the orientation of the horizontally tilted outer coil portions toward a vertical position so that the inner and outer coil portions are substantially aligned with the core grooves. In addition, due to the provision of the external coil holding device, the inner portions of the coils are moved under reduced pressure so that damage to the coils and other undesirable consequences are eliminated.

Preferably, the coil holding device comprises a pair of pivoted arms of identical construction which are rotated in opposite directions to each other. The pivoted arms are normally in a horizontal position and rotated to a vertical position when the inner coil portions start to move toward the core structure. Each pivoted arm is formed of a part-cylindrical portion and an upwardly turned end portion. The part-cylindrical portion of each arm bears against the outer coil sections so that the latter are depressed downwardly toward the jig and held in the upwardly turned end portion. The inner pusher and outer holding device coact with each other to advance the inner and outer portions of the coils toward the core structure.

BRIEF DESCRIPTION OF THE DRAWINGS

The invention will be further described with reference to the accompanying drawings, in which.

DETAILED DESCRIPTION

Figure 1:
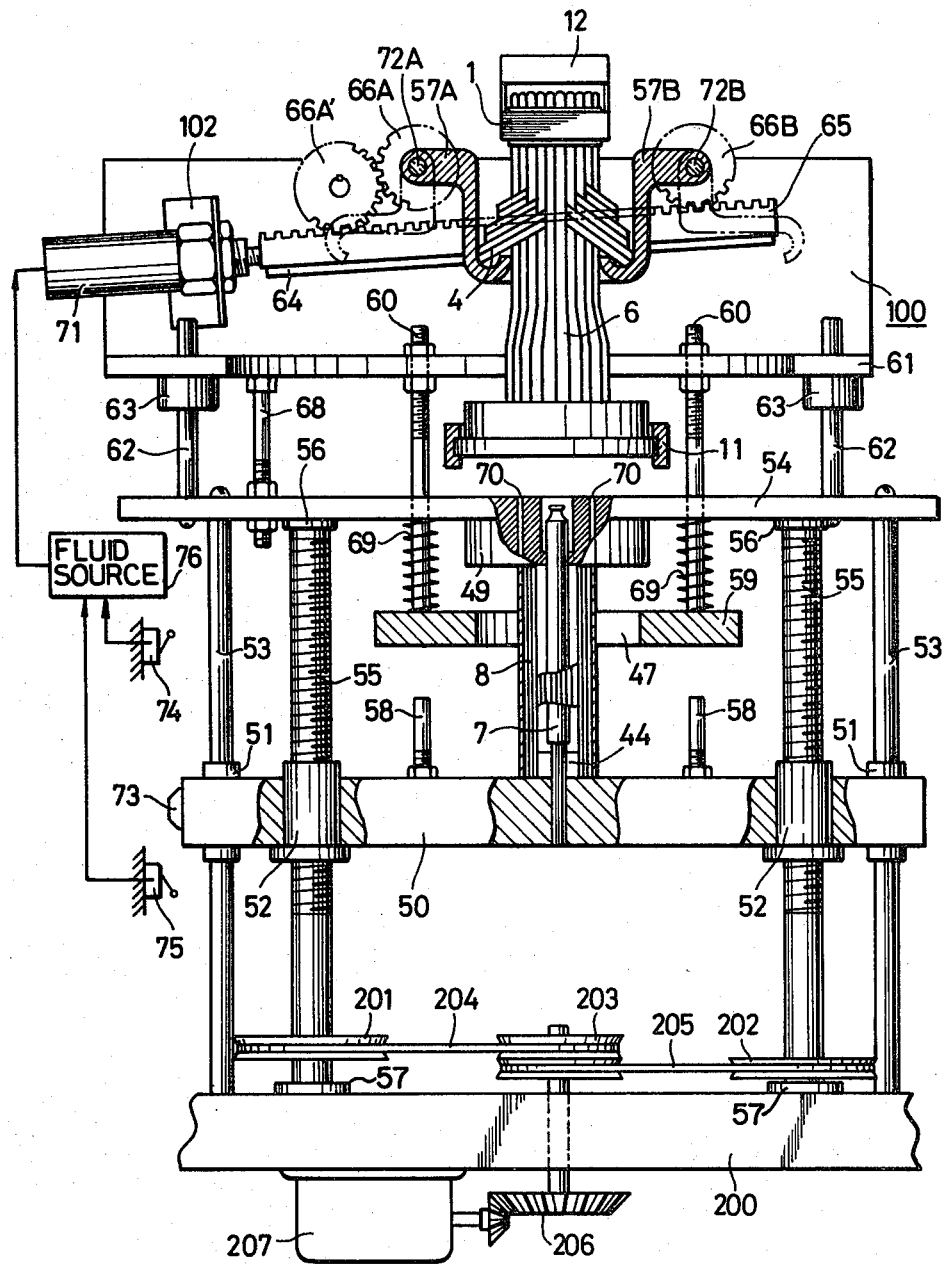
FIG. 1 is a front elevational, partially broken view of the coil insertion apparatus embodying the invention.
Figure 2:
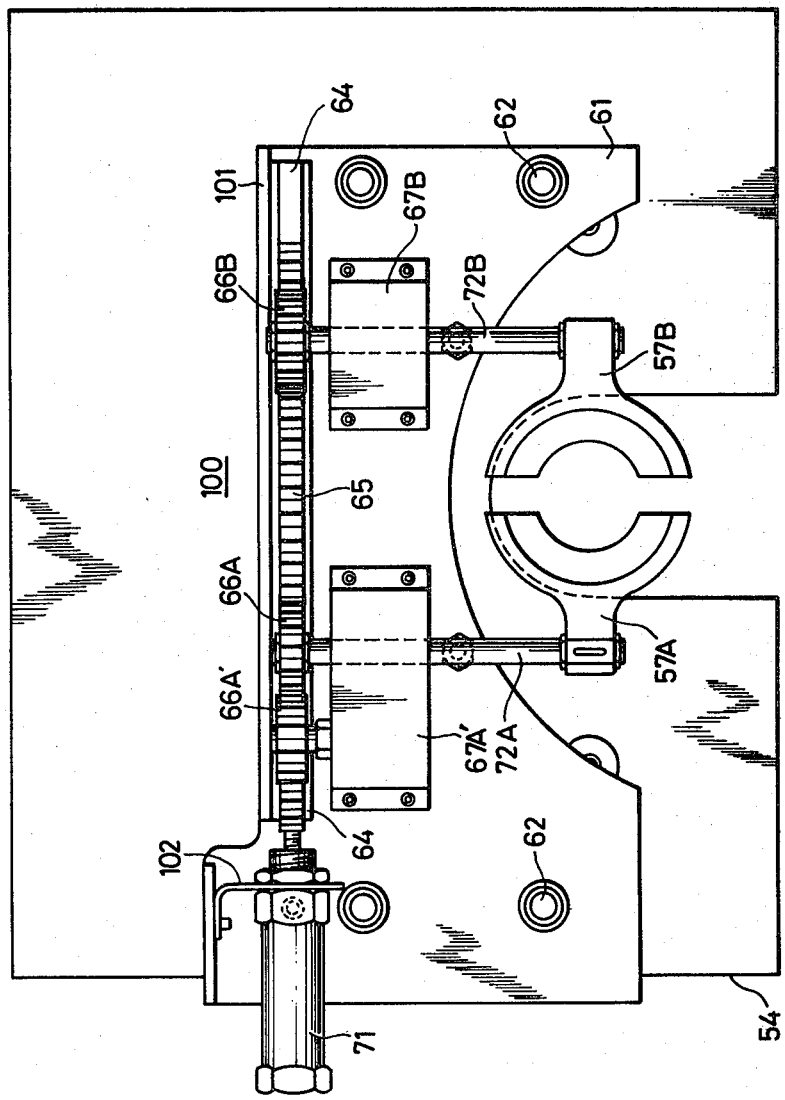
FIG. 2 is a plan view of the apparatus of FIG. 1.

Referring now to FIGS. 1 and 2, a coil inserting apparatus constructed according to the present invention is illustrated as generally comprising a lower stationary support 200, an upper stationary support 54, a support 50 vertically movable between the lower and upper support members 200, 54 and an external coil raising device 100 normally positioned a predetermined distance above the upper support 54 by a stopper 68. Device 100 is arranged to be moved upward by upward movement of the movable support 50. A pair of externally threaded rotary shafts 55 extend between upper and lower bearings 56 and 57 embedded respectively in the upper and lower support members 54 and 200. Shafts 55 are threadably engaged with a pair of internally threaded bushings 52 embedded in the movable support 50. The threaded rotary shafts 55 are operably coupled by pulleys 201, 202, 203 and belts 204 and 205 and by a worm gear arrangement 206 to the drive shaft of a motor 207 secured to the lower support 200 to move the support 50 vertically in opposite directions with respect to the upper and lower stationary supports 54 and 200. The vertical movement of the movable support 50 is guided by means of a pair of guide shafts 53 having upper and lower ends respectively connected to the upper and lower stationary supports 54 and 200 through bearings 51 secured to the support 50.

The external coil raising device 100 comprises a vertical support plate 101 and a horizontal support plate 61 which, as clearly shown in FIG. 2, has a semicircular cutout portion to accommodate a coil inserting jig 6, mounted on a jig positioning device 11. To the horizontal support plate 61 is secured a pair of bolts 60 which extend downwardly through the upper stationary support 54 to carry a lift member 59 above a pair of stoppers or bolts 58 fixed to the movable support 50. The coil raising device 100 is moved upward by the movable support 50 when the stopper bolts 58 are brought into contact with the lift member 59 against springs 69. A pair of guide shafts 62 is secured to the upper stationary support 54 through bearings 63 secured to the horizontal support plate 61 to assist in smoothly moving the coil raising device 100 in opposite directions.

On the upper stationary support 54 is provided a pusher advancing rod guide block 49 having a plurality of vertically extending angularly spaced-apart parallel guide grooves 70 and a center guide opening through which a pusher advancing rod 7 extends. The lower end of the rod 7 is rigidly fixed to the movable support 50. Concentric to the rod 7 is provided a plurality of vertically extending angularly spaced-apart wedge inserting members 8 which respectively extend into the guide grooves 70 of the guide block 49 through an opening 47 of the lift member 59; members 8 are secured to the movable support 50 by a fixing block 44. The guide grooves 70 are in registry with vertical slots formed along the wedge guides of the jig 6 to align the wedge inserting members 8 with the wedge guide slots of the jig 6 for the purpose of inserting insulator wedges into respective grooves of a stator core 1 mounted on the jig 6.

Upper and lower proximity sensors or microswitches 74 and 75 are fixedly positioned with respect to the movable support 50 to provide a control signal to a hydraulic source 76 when sensing fingers thereof are operated by a contact member or dog 73 attached to an edge of the support 50.

The coil raising device 100 further comprises a hydraulically operated cylinder 71 supported by a bracket 102 in turn fixed to the vertical support plate 101. Cylinder 71 includes a piston coupled to a rack 65 which is movably supported on a rack support 64 fixed to the vertical support 101. The hydraulic cylinder 71 is operated in response to hydraulic pressure supplied from the source 76 to move the piston of the cylinder to an extended position when the upper proximity sensor 74 is activated during upward movement of the support 50. The cylinder piston is moved to the retracted position when the lower proximity sensor 75 is activated by downward movement of the support 50. Therefore, the rack 65 is moved to the left (as viewed in FIG. 1) when the movable support 50 is lowered to a point below the upper proximity sensor 74 and returns to the original position when the support 50 is raised above the lower proximity sensor 75. Coil holding arms 57A and 57B of generally J-shaped elevational cross-section are mounted on respective pivot shafts 72A and 72B as clearly shown in FIGS. 1 and 2. The pivot shafts 72A and 72B are journalled through respective bearings 67A and 67B which are secured to the support plate 101 and carry respective pinions 66A and 66B. The pinion 66B is directly meshed with the rack 65, while the pinion 66A is meshed with rack 65 via a second pinion 66A' so that the coil holding arms 57A and 57B are initially in a horizontal position as indicated by a chain-dot line in FIG. 1 and rotate in opposite directions to each other to the illustrated vertical position when the rack 65 is moved to the left.

Figure 3:
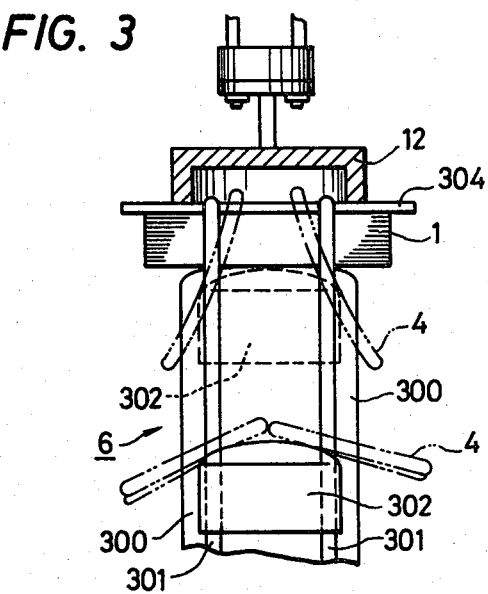
FIG. 3 is a front view in elevation of a jig showing coils being mounted prior to an insertion operation.

The coil inserting jig 6 is of a conventional design. This jig includes a plurality of vertically extending angularly spaced-apart wedge guides 300 as shown in FIG. 3. As previously described, wedge guide slots are provided respectively along the length of the wedge (not shown) guides 300 to permit insertion of insulator wedges into respective grooves of the stator core structure 1. A plurality of vertically extending guide blades 301 extend upwardly of the jig 6 through the core structure 1.

In operation, a plurality of loosely bundled coils 4 are prepared and inserted respectively into coil guide paths formed between wedge guides 300 and guide blades 301 and secured at a point halfway from the bottom of the jig 6 in a substantially horizontal tilted position with the inner portions of the coils 4 resting on an internal coil pusher 302 and the remainder of the coils extending radially outwardly. A stator core holding member 12 is placed on the core structure 1 with a clamping plate 304 between the holder and core structure when the coil-mounted jig 6 is placed on the positioning device 11 of the coil insertion apparatus as shown in FIG. 1.

Figure 4:
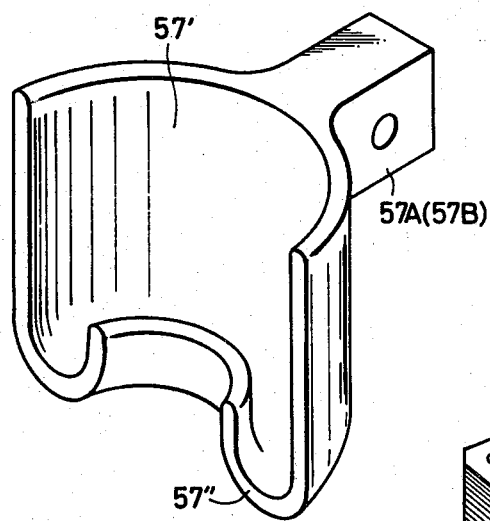
FIG. 4 is a perspective view of a coil lifting arm of FIGS. 1 and 2.

The motor 207 is energized to rotate the shafts 55 to lift the movable support 50 to an upward position so that the pusher advancing rod 7 and wedge inserting members 8 are raised together through the guide block 49. The pusher advancing rod 7 engages the pusher 302 of the jig 6 to advance it upward and the wedge inserting members 8 are guided by blades 301 into alignment with the grooves of stator core structure 1. The upper proximity sensor 74 is then activated to move the rack 65 to the left from its original position whereby the pivoted coil holding arms 57A and 57B are rotated in opposite directions from the horizontal position to a vertical position where they engage the outwardly extending portions of the coils 4. More specifically, the vertically extending part-cylindrical portions 57' (see FIG. 4) of the holding arms 57A, 57B bear against the outer portions of the coils 4 to orient the arms toward a vertical position and hold the arms so lower end portions 57" are turned upwardly.

When the holding arms 57A, 57B are brought to the vertical position, the bolts 58 of the moving support 50 engage the lifting plate 59 of the coil raising device 100 so that the coil holding arms 57A, 57B are raised to an upward position at the same speed as the pusher 302. Therefore, the inner and outer portions of the coils 4 are pushed upward at equal speeds. During this upward movement of the coils 4, the outer coil holding arms 57A, 57B coact with the inner pusher 302 to align the inner and outer portions of the coils toward the core structure 1 to achieve smooth insertion of coils 4 into the core grooves.

Figure 5:
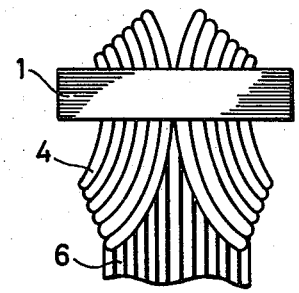
FIG. 5 is a view illustrating coils fully inserted into the grooves of a core structure on the jig.

When the inner portions of the coils 4 extend through the core grooves and further upward as shown in FIG. 5, the motor 207 is deactivated. Simultaneously with the coil inserting operation, the wedge inserting members 8 move upward to insert insulator wedges (not shown) into the core grooves in a well known manner.

The motor 207 is subsequently operated by a reverse current to disengage the pusher advancing rod 7 from contact with the pusher 302 and to permit the coil raising device 100 to move downward under its own weight, as assisted by the springs 69, until device 100 engages the stopper 68.

The support 50 is further moved downward activating the lower proximity sensor 75 to extend the cylinder 71. The coil holding arms 57A and 57B are turned to the original horizontal positions thereof to permit the coil inserting jig 6 to be removed from the positioning device 11.

Figure 6:
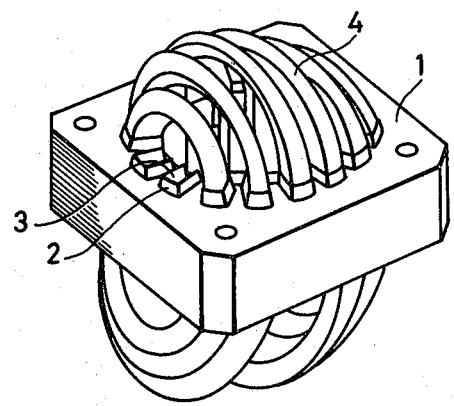
FIG. 6 is a perspective view of the core structure removed from the jig after inserting operation.

With the coils 4 so inserted, the core 1 is then removed from the jig 6. FIG. 6 is an illustration of the stator core structure 1 with the coils 4 inserted into the grooves 3 having inner walls fitted with insulators 2.

It is seen that with the assistance of the externally provided coil raising device 100 the inner portions of the coil 4 are guided into the stator core 1 with reduced force so that scratches or damaging effects on the coil and deformation of the stator core structure are prevented.

Although in the foregoing description, the inner and outer portions of the coil 4 are raised at the same speed, they could also be raised at slightly different speeds to achieve the best result in so far as the inner and outer raising operations are performed during the same period of time. Furthermore, the external coil raising device 100 could also be modified so that it is constituted by more than two pivoted arms according to the structure of the stator core.

What is claimed is:

1. A coil insertion apparatus for inserting loosely bundled coils respectively into grooves of a core structure angularly spaced-apart parallel guide paths by pushing inner portions of said coils by means of a coil pusher, comprising:
   first means for moving said coil pusher to advance said inner portions into said grooves;
   second means movably mounted externally of said parallel guide paths to engage outer portions of said coils; and
   third means for causing said second means to engage said outer portions when said pusher initiates advancing of said inner portions and for moving said second means to advance said outer portions to said core structure.

2. A coil insertion apparatus as claimed in claim 1 wherein said second means comprises a pair of oppositely pivotable arms each having a part-cylindrical portion and an upwardly turned end portion.

3. A coil insertion apparatus as claimed in claim 1, wherein said third means comprises means for moving said second means in coaction with said first means.

4. A coil insertion apparatus as claimed in claim 3, wherein said third means comprises means for moving said second means substantially at the same speed as said coil pusher.

* * * * *